Figure 1:
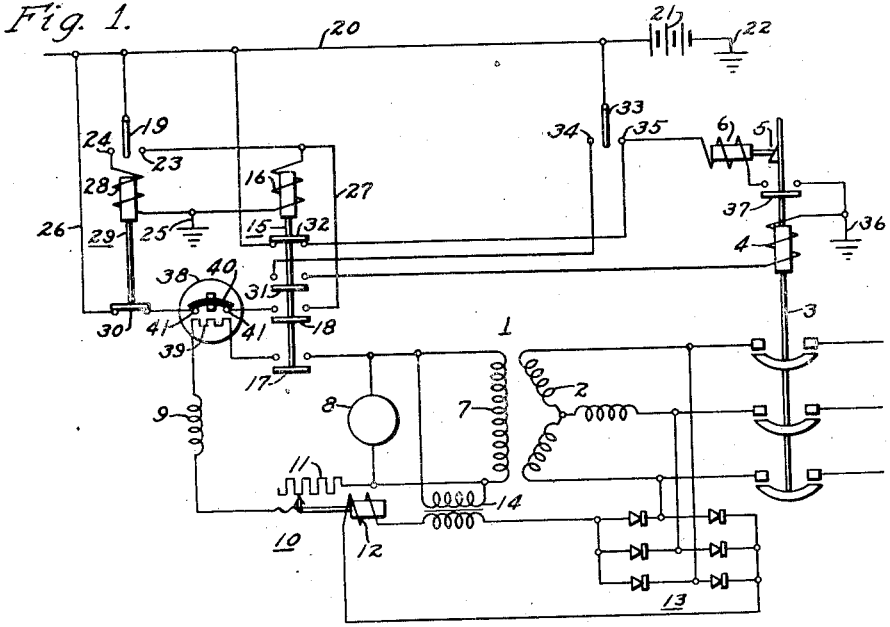

Aug. 19, 1947.                D. W. EXNER                2,426,005
                        GENERATOR FAULT PROTECTION
                           Filed Aug. 19, 1943

WITNESSES:
Leon M. Garman
F. P. Lyle

INVENTOR
Donald W. Exner.
BY O.D.Buchanan
ATTORNEY

Patented Aug. 19, 1947

2,426,005

UNITED STATES PATENT OFFICE 2,426,005

GENERATOR FAULT PROTECTION

Donald W. Exner, Lima, Ohio, assignor to Westinghouse Electric Corporation, East Pittsburgh, Pa., a corporation of Pennsylvania Application August 19, 1943, Serial No. 499,189

10 Claims. (Cl. 171—312)

1

The present invention relates to a protective relay system for protection against internal faults in alternating-current, or constant-speed direct-current, generators and, more particularly, to such a system which is especially adapted for use with aircraft generators.

The protective relay system of the present invention is especially intended for use with generating systems for use on aircraft, although its usefulness is not necessarily restricted to this particular application. Alternating-current aircraft generating systems consist of an alternating-current generator, an exciter, or other means for supplying direct-current excitation to the generator field, and a voltage regulator controlling either the exciter field current or the generator field current to maintain the generator voltage substantially constant. The invention is also applicable to some types of direct-current aircraft generating systems, consisting of a direct-current generator driven at constant speed, a separate exciter, and a voltage regulator. The occurrence of an internal fault in the generator of such systems may be very dangerous, since the generator terminal voltage drops upon the occurrence of a fault and the voltage regulator increases the field current, thus tending to increase the current flowing into the fault. In this way, a bad fire may be started unless the generator excitation is promptly removed.

The usual methods for protection against internal generator faults, used for other applications, involve the use of some type of differential relaying system. Such systems, however, require the use of relatively heavy and bulky relays which are unsuitable for use on an airplane, where the space is limited and the weight must be kept to a minimum. Differential relaying systems are also relatively expensive, especially as compared to the cost of generators of relatively small physical size, such as are used on aircraft. For this reason, the conventional types of protective systems, which are usually used for protection against internal generator faults, are not suitable for use on aircraft, and some lighter and simpler system must be used, even though its response may be somewhat slower.

The principal object of the present invention is to provide a protective relaying system, for protection against internal generator faults, which is simple and light in weight so as to be especially well suited for use with aircraft generators.

A further object of the invention is to provide a protective relay system for protection against internal faults in alternating-current or constant-speed direct-current generators provided with a voltage regulator, the relay system operating in response to a condition of maximum or excessive current in the excitation system of the generator.

Another object of the invention is to provide a protective relay system for protection against internal generator faults, using a simple lightweight time-delay current or voltage responsive relay which operates to remove the excitation from the generator in response to a condition of maximum or excessive current in the excitation system.

A more specific object of the invention is to provide a protective relay system for protection against internal generator faults, using a simple thermal relay having a heater element which is energized by, or in response to, the current in the excitation system of the generator, and which has contacts connected to effect deenergization of the excitation system in response to heating caused by maximum or excessive current in the excitation system.

Figure 2:
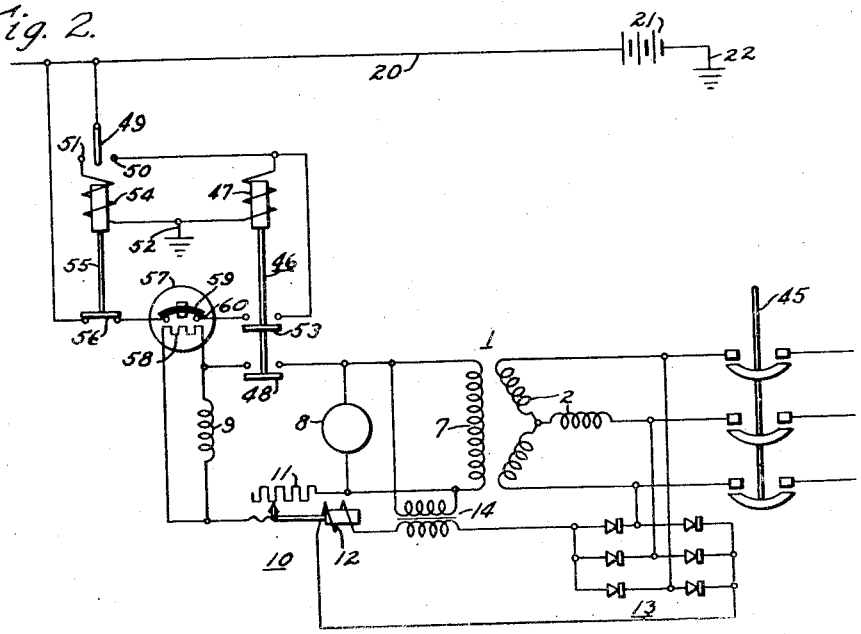

The invention will be more fully understood from the following detailed description, taken in connection with the accompanying drawing, in which:

Figure 1 is a schematic wiring diagram showing one embodiment of the invention; and Fig. 2 is a similar diagram showing another embodiment of the invention.

One embodiment of the invention is shown in Fig. 1 in connection with an alternating-current generator 1, which may be of any type. The generator 1 is driven by any suitable prime mover which, in an aircraft application, is usually the aircraft engine, the generator being preferably driven at a constant speed from the engine in any suitable manner. The generator 1 has a three-phase armature winding 2, which is connected to the load circuit by means of a circuit breaker 3. The circuit breaker 3 is shown as being of the latching type, having a closing coil 4 which moves the breaker to closed position when energized, and a latch 5 which latches the breaker in its closed position. A trip coil 6 is provided to release the latch and permit the breaker to open.

The generator 1 has a field winding 7 which is supplied with direct current by an exciter having an armature 8 and a self-excited field winding 9. The excitation system of the generator also includes a voltage regulator 10, which has been shown diagrammatically as including a variable resistance 11, connected in series with the exciter field 9, and an operating coil 12, connected to a three-phase rectifier 13. The rectifier 13 is connected across the terminal voltage of the generator 1, so that any change in the generator voltage affects the energization of the coil 12, which effects a corresponding adjustment in the value of the resistance 11 to change the excitation and restore the voltage to its correct value. The voltage regulator 10 preferably also includes a damping transformer 14, having its primary winding connected across the generator field 7 and its secondary winding connected in series with the coil 12. The voltage regulator, as such, forms no part of the present invention, and any suitable type of regulator may be used.

The circuit of the exciter field winding 9 is controlled by an exciter field relay 15, which has an operating coil 16, and a contact 17 connected in the exciter field circuit, so that when the coil 16 is energized, the contact 17 closes and completes the circuit of the exciter field winding 9. The exciter field relay 15 also has a holding contact 18 which is connected to complete a holding circuit when it closes, to maintain the energization of the coil 16. The coil 16 of the relay 15 is initially energized by means of a manually operated switch-arm 19, which is preferably of a type that is returned to its open position as soon as it is released, by a spring or other means. The switch-arm 19 is connected to a direct-current bus 20, which is supplied from any suitable source of direct current, indicated diagrammatically as a battery 21, one terminal of which is connected to the bus 20 and the other terminal grounded at 22.

The switch-arm 19 is adapted to be placed alternatively on either of two fixed contacts 23 and 24. The contact 23 is connected to the coil 16 of the relay 15, so that when the switch-arm 19 is placed on the contact 23, a circuit is completed from the direct-current bus 20 through the coil 16 to a ground connection 25, energizing the coil 16. When the relay 15 closes its contacts 17 and 18 in response to energization of the coil 16, the exciter field 9 is connected to the exciter armature 8 by the contact 17, and the contact 18 completes a holding circuit from the direct-current bus 20 through the conductors 26 and 27 to the coil 16, so that the coil remains energized after the switch-arm 19 returns to its open position.

The contact 24 is connected to the operating coil 28 of a tripping relay 29, which has a normally-closed contact 30 connected in the holding circuit for the coil 16. Thus, when the switch-arm 19 is placed on the contact 24, the coil 28 is energized and the contact 30 is opened, interrupting the holding circuit for the coil 16, and permitting the relay 15 to open its contacts.

The exciter field relay 15 preferably also has an additional normally-open contact 31 and a normally-closed contact 32 for the control of the circuit breaker 3. The circuit breaker 3 is actuated by a manually operated switch-arm 33, which is preferably of the same type as the switch-arm 19, having a spring or other means for returning it to the open position as soon as it is released. The switch-arm 33 is adapted to be placed alternatively on either of two fixed contacts 34 and 35, and it is connected to the direct-current bus 20. The contact 34 is connected in series with the normally-open contact 31 of the relay 15 and the closing coil 4 of the circuit breaker 3, the other end of the coil 4 being grounded, as indicated at 36. The normally-closed contact 32 of the relay 15 is connected in series between the direct-current bus 20 and the trip coil 6 of the circuit breaker 3, and the contact 35 is also connected to the trip coil 6. The other end of the trip coil 6 is connected to ground at 36, the connection being made through an auxiliary contact 37 on the circuit breaker 3, which is open when the breaker is open.

Protection against internal faults in the generator 1 is provided by means of a thermal relay 38. Any type of time-delay current-responsive relay might be used for this purpose, but a simple thermal relay is preferred, since it is the lightest in weight of any available type of relay which is suitable for the purpose. The relay 38 is shown as having a heating coil 39, which is connected in series in the circuit of the exciter field winding 9, and a thermally-responsive element 40, which may be a bimetallic disc, adapted in its closed position to bridge a pair of fixed contacts 41. The contacts 41 are connected, as shown, in the holding circuit of the relay 15. The thermally-responsive relay 38 is calibrated so that it does not respond to the normal exciter field current, or to the field currents corresponding to normal or expected generator overloads, but it is responsive to a sustained condition of maximum current in the exciter field circuit or, more generally, to an excessive exciter field current which is greater than the current corresponding to a permissible generator overload. The thermally-responsive element 40 is designed to flex out of engagement with the contacts 41, and thus interrupt the holding circuit of the relay 15, when it is heated above a predetermined temperature by excessive exciter field current flowing through the heater coil 39. The relay 38 is preferably mounted in a position where it is not exposed to direct heating from the generator or exciter, and if it is necessary, in a particular case, to locate the relay 38 in a position where it is subjected to such heating, a temperature-compensated type of relay should be used, so that it will not be affected by heat received directly from the generator or exciter.

The operation of this system is as follows. Assume that the generator 1 is disconnected from the load circuit, with the circuit breaker 3 open, and the relays 15 and 29 in their deenergized positions, as shown on the drawing. If the generator 1 and exciter are being driven by the prime mover at the proper speed, the generator 1 can be connected to the line. In order to do this, the field 7 is first excited by placing the switch-arm 19 on the contact 23. This energizes the coil 16, as previously explained, and causes the exciter field relay 15 to close its contacts 17, 18 and 31, and to open the contact 32. The switch-arm 19 may be released as soon as the relay 15 has operated, since a holding circuit is completed by closure of the contact 18 extending from the direct-current bus 20 through the conductor 26, the normally closed contact 30 of the relay 29, the contracts 41 and bimetallic disc 40 of the relay 38, the contact 18, conductor 27 and coils 16 to ground connection 25. Thus, the relay 15 remains in its actuated position. Closure of the contact 17 of the relay 15 completes the circuit for the exciter field winding 9, so that the field winding 7 of the generator 1 is energized from the exciter 8, to which it is preferably permanently connected. The circuit breaker 3 can now be closed by placing the switch-arm 33 on the contact 34, which completes a circuit from the direct-current bus 20 through the contact 31 of the relay 15, which is now closed, to the closing coil 4 of the breaker 3, so that the breaker closes to connect the generator 1 to the load circuit. The breaker 3 latches in closed position and remains closed after the switch-arm 33 is released and returns to its open position, deenergizing the closing coil 4. The generator 1 is now connected to the load and the system is in its normal running condition.

If an internal fault occurs in the armature winding 2 of the generator 1, the generator terminal voltage will immediately drop to substantially zero, or at least to a relatively low value. The voltage regulator 10 will attempt to restore the voltage to its normal value by increasing the excitation, and will adjust the variable resistance 11 to its lowest value, thus producing a condition of ceiling current, or maximum current, in the exciter field circuit and in the generator field circuit. This excessive current in the exciter field circuit increases the heating effect of the heater coil 39 so that the thermally-responsive element 40 is heated to the temperature at which it operates to interrupt the circuit through the contacts 41. In this way, the holding circuit of the relay 15 is interrupted and the coil 16 is deenergized, permitting the relay 15 to drop out and open the contact 17, interrupting the exciter field circuit and thus removing the excitation from the generator 1, so that the dangerous condition of excessive current flowing into the internal fault is prevented.

When the relay 15 drops out, opening the contacts 17, 18 and 31, the contact 32 closes and completes a circuit from the direct-current bus 20 through the trip coil 6 of the circuit breaker 3 and the auxiliary contact 37, which is closed when the breaker is closed, to the ground connection 36. The trip coil 6 is, therefore, energized, and the breaker 3 is tripped to disconnect the generator from the load circuit, the circuit through the trip coil 6 being interrupted by opening of the auxiliary contact 37 when the breaker opens. Thus, the protective system operates automatically in response to excessive current in the excited field circuit to remove excitation from the generator and to trip the circuit breaker 3.

In normal operation, the generator 1 can be disconnected from the line by placing the switch-arm 19 on the contact 24. This energizes the coil 28 of the relay 29 and causes it to open its contact 30, thus interrupting the holding circuit of the relay 15. The relay 15 then drops out, effecting deenergization of the exciter field winding 9 and tripping of the circuit breaker 3 in the manner described above. If it is desired to disconnect the generator 1 from the load circuit without removing the excitation, this can be done by placing the switch-arm 33 on the contact 35 which energizes the trip coil 6 directly from the direct-current bus 20, and trips the circuit breaker 3 without affecting the relay 15, so that the breaker can be tripped without removing excitation from the generator 1.

Thus, it will be seen that by the use of the thermal relay 38 a simple but effective protective relay system is provided for removing excitation from the generator 1 in case of an internal fault, and preferably also for tripping the circuit breaker 3 to disconnect the generator from the load circuit. Various modifications of this system are, of course, possible within the scope of the invention. Thus, the control of the circuit breaker 3 by the relay 15 can be eliminated in some cases, although it is usually desirable, and is necessary if the generator 1 is operating in parallel with one or more other generators.

The heater element 39 of the thermal relay 38 has been shown connected in the exciter field circuit, but it will be apparent that it could equally well be connected in the circuit of the generator field winding 7 so as to be responsive to the generator field current. It is usually preferable, however, to connect it in the exciter field circuit because a higher ratio is obtained between the maximum or ceiling exciter field current, when the relay must operate, and normal overload field current when the relay should not operate. This higher ratio in the exciter field circuit is the result of magnetic saturation in the generator and exciter. The generator field current increases at a faster rate than the load current because of the shape of the saturation curve, but the exciter field current rises still more rapidly with respect to the exciter armature current, which is substantially equal to the generator field current, because the exciter voltage rises as its armature current increases. For this reason, a higher ratio of maximum current to overload current is obtained in the exciter field circuit, and it is therefore preferred to connect the relay heater 39 in this circuit, since it simplifies the design of the relay and enables a faster tripping time to be obtained, as well as enabling the relay to distinguish more readily between overload conditions and fault conditions. Another advantage of placing the relay in the exciter field circuit is that the current is smaller than the current in the generator field circuit, so that the relay can be made smaller and lighter. The system will operate in the same manner, however, if the heater coil 39 is designed to be connected in the generator field circuit, and such an arrangement is within the scope of the invention.

The thermal relay 38 has been shown and described as having its contacts connected in the holding circuit for the exciter field relay 15. If a type of thermal relay is used in which the contacts remain open after operation until they are manually reset, the contacts might be connected directly in the exciter field circuit, or in the generator field circuit, and in some cases this might result in some simplification in the control system. Such a relay, however, is somewhat more expensive than the type shown in the drawing, which recloses its contacts as soon as it has cooled, and when the latter type is used, its contacts are preferably connected in an auxiliary circuit, as shown in the drawing, in order to prevent cycling, or repeated operation, as the relay cools and then is reheated.

A further modification of the invention is shown in Fig. 2, which shows the use of a voltage-responsive relay instead of a current-responsive relay. In this figure, the generator 1 and exciter 8 may be the same as in Fig. 1, with a voltage regulator 10 connected in the same manner as in Fig. 1. The generator 1 is connected to a load circuit by means of a circuit breaker 45, which may be operated manually, or in any suitable manner. The circuit of the exciter field winding 9 is controlled by an exciter field relay 46, having an operating coil 47, and a contact 48 connected to complete the circuit of the exciter field winding 9. The coil 47 is energized by means of a switch-arm 49 which may be similar to the switch-arm 19 of Fig. 1, and which is adapted to be placed on either of two fixed contacts 50 and 51.

The switch-arm 49 is connected to the direct-current bus 20, and when placed on the contact 50 completes an obvious circuit through the coil 47 to the ground connection 52. The relay 46 also has a holding contact 53 which completes a holding circuit when closed to maintain the energization of the coil 47. The contact 51 is connected to the operating coil 54 of a tripping relay 55 which has a normally-closed contact 56 connected in the holding circuit for the relay 46.

Protection against internal generator faults is provided in this embodiment of the invention by a thermal relay 57 which has a heater coil 58 and a thermally-responsive element 59 arranged to normally bridge a pair of contacts 60. The contacts 60 are connected in series with the contact 56 in the holding circuit for the relay 46. The heater coil 58 is a voltage-responsive coil, and is connected across the exciter field winding 9 so as to be responsive to the voltage across it, which is, of course, proportional to the exciter field current. Since the coil 58 is connected across the exciter field winding 9, it carries a current which is proportional to the current in the field winding 9, and the relay 57 is calibrated to operate in response to heating of the coil 58 corresponding to maximum current in the exciter field winding 9, or to an excessive current which is greater than the exciter field current corresponding to any permissible normal overload of the generator 1.

It will be apparent that the operation of this embodiment of the invention is similar to that described above in connection with Fig. 1. Thus, the generator field 7 is energized by placing the switch-arm 49 on the contact 50, which completes a circuit through the coil 47 to the ground connection 52, thus energizing the coil 47 and causing the relay 46 to close its contacts 48 and 53. Closing of the contact 48 completes the exciter field circuit and effects energization of the generator field 7, since the generator field is connected to the exciter, while closing of the contact 53 completes an obvious holding circuit for the relay 46 to maintain the coil 47 energized and hold the contact 48 closed.

In case of an internal fault in the generator, the voltage regulator 10 operates in the manner described above to increase the exciter field current to its maximum value, and this causes the thermally-responsive element 59 of the relay 57 to operate to interrupt the holding circuit for the relay 46, permitting the relay to drop out and deenergize the exciter field winding.

In normal operation, the excited field winding can be deenergized by moving the switch-arm 49 into engagement with the contact 51, which energizes the coil 54 of the tripping relay 55 and causes it to open its contact 56, interrupting the holding circuit for the relay 46. The circuit breaker 45 may be operated in any desired manner, either manually or by any suitable control system, such as that shown in Fig. 1.

The heater coil 58 of the thermal relay 57, in the embodiment of Fig. 2, may be connected across the generator field winding 7 rather than the exciter field winding 9 if desired, but it is preferred to connect it across the exciter field winding because of the higher ratio of maximum field current to overload field current obtainable in the exciter field circuit, as compared to the corresponding ratio in the generator field circuit, as explained above in connection with Fig. 1. The heater coil 58 may, however, be connected in either position within the scope of the invention, and the relay contacts 60 might be connected directly in either the exciter field circuit or the generator field circuit as explained above, although it is preferred to connect them in an auxiliary control circuit, as shown, when a thermal relay of the automatic reclosing type is used in order to avoid cycling of the system.

It should now be apparent that a simple and reliable protective relay system has been provided for the protection of electric generators against internal faults, and that this system is particularly adapted for use in connection with aircraft generators because of its use of a simple light-weight relay. The generator 1 has been shown and described as a three-phase alternating-current generator, but the invention is also applicable to other types of generators, such as single-phase generators, and direct-current generators driven at constant speed and provided with separate exciters.

It will be understood, of course, that the invention is capable of various modifications, some of which have been indicated above, and that it is not limited to the particular details shown and described for the purpose of illustration. Thus, any type of time-delay current- or voltage-responsive relay might be used, although a thermal relay is preferred because of its light weight and simplicity. Similarly, various other changes and modifications might be made within the scope of the invention, and it is to be understood, therefore, that the invention is not limited to the particular arrangement shown, but in its broadest aspects it includes all equivalent modifications and embodiments which come within the scope of the appended claims.

I claim as my invention:

1. In combination, a generator, a field winding for said generator, an exciter connected to supply direct current to said generator field winding, a field winding for said exciter, means for effecting an increase in current in said exciter field winding in response to a drop in the generator voltage, and means responsive only to continued excessive total current in the exciter field winding for effecting deenergization of the exciter field winding.

2. In combination, a generator, a field winding for said generator, an exciter connected to supply direct current to said generator field winding, a field winding for said exciter, means for effecting an increase in current in said exciter field winding in response to a drop in the generator voltage, and time-delay relay means responsive only to excessive total current in the exciter field winding for effecting deenergization of the exciter field winding.

3. In combination, a generator, a field winding for said generator, an exciter connected to supply direct current to said generator field winding, a field winding for said exciter, means for effecting an increase in current in said exciter field winding in response to a drop in the generator voltage, and thermally-responsive relay means having a heating element connected in series with the exciter field winding and having contact means adapted to be actuated in response to heating caused by excessive current in the exciter field winding, said contact means being operative when actuated to effect deenergization of the exciter field winding.

4. In combination, a generator, a field winding for said generator, a circuit breaker for connecting said generator to a load circuit, an exciter connected to supply direct current to said generator field winding, a field winding for said exciter, means for effecting an increase in current in said exciter field winding in response to a drop in the generator voltage, and thermally-responsive relay means having a heating element connected in series with the exciter field winding and having contact means adapted to be actuated in response to heating caused by excessive current in the exciter field winding, said contact means being operative when actuated to effect deenergization of the exciter field winding, and tripping of said circuit breaker.

5. In combination, a generator, a field winding for said generator, an exciter connected to supply direct current to said generator field winding, a field winding for said exciter, means for effecting an increase in current in said exciter field winding in response to a drop in the generator voltage, and thermally-responsive relay means having a heating element connected across the exciter field winding, and having contact means adapted to be actuated in response to heating caused by excessive current in the exciter field winding, said contact means being operative when actuated to effect deenergization of the exciter field winding.

6. In combination, a generator, a field winding for said generator, an exciter connected to supply direct current to said generator field winding, a field winding for said exciter, means for effecting an increase in current in said exciter field winding in response to a drop in the generator voltage, thermally-responsive relay means having a heating element connected in series with the exciter field winding and having contact means adapted to be actuated in response to heat from said heating element, a relay having contacts connected in the circuit of the exciter field winding, and means for energizing said last-mentioned relay to cause it to close its contacts to effect energization of the exciter field winding, said relay also having contacts for completing a holding circuit for maintaining the relay energized, the contact means of said thermally-responsive relay being also connected in said holding circuit and being adapted to interrupt said circuit in response to heating caused by excessive exciter field winding current.

7. In combination, a generator, a field winding for said generator, a circuit breaker for connecting said generator to a load circuit, an exciter connected to supply direct current to said generator field winding, a field winding for said exciter, means for effecting an increase in current in said exciter field winding in response to a drop in the generator voltage, thermally-responsive relay means having a heating element connected in series with the exciter field winding and having contact means adapted to be actuated in response to heat from said heating element, a relay having contacts connected in the circuit of the exciter field winding, and means for energizing said last-mentioned relay to cause it to close its contacts to effect energization of the exciter field winding, said relay also having contacts for completing a holding circuit for maintaining the relay energized and for effecting control of said circuit breaker, the contact means of said thermally-responsive relay being also connected in said holding circuit and being adapted to interrupt said circuit in response to heating caused by excessive exciter field winding current.

8. In combination, a generator, a field winding for said generator, an exciter connected to supply direct current to said generator field winding, a field winding for said exciter, means for effecting an increase in current in said exciter field winding in response to a drop in the generator voltage, thermally-responsive relay means having a heating element connected across the exciter field winding and having contact means adapted to be actuated in response to heat from said heating element, a relay having contacts connected in the circuit of the exciter field winding, and means for energizing said last-mentioned relay to cause it to close its contacts to effect energization of the exciter field winding, said relay also having contacts for completing a holding circuit for maintaining the relay energized, the contact means of said thermally-responsive relay being also connected in said holding circuit and being adapted to interrupt said circuit in response to heating caused by excessive exciter field winding current.

9. In combination, a generator, an excitation system for supplying field excitation to said generator, said excitation system including a generator field winding and means for supplying direct-current excitation to said field winding, means responsive to the generator voltage for effecting an increase in the current in said excitation system in response to a decrease in generator voltage, and thermally-responsive means having a heating element energized in response to the total current in a part of the excitation system, said thermally-responsive means being adapted to effect deenergization of the excitation system when heated in response to excessive current in said part of the excitation system.

10. In combination, a generator, an excitation system for supplying field excitation to said generator, said excitation system including a generator field winding and means for supplying direct-current excitation to said field winding, means for connecting said generator to a load circuit, means responsive to the generator voltage for effecting an increase in the current in said excitation system in response to a decrease in generator voltage, and thermally-responsive means having a heating element energized in response to the total current in a part of the excitation system, said thermally-responsive means being adapted to effect deenergization of the excitation system and disconnection of the generator from the load circuit when heated in response to excessive current in said part of the excitation system.

DONALD W. EXNER.

REFERENCES CITED

The following references are of record in the file of this patent:

UNITED STATES PATENTS

| Number | Name | Date |
| --- | --- | --- |
| 2,324,825 | Crary | July 20, 1943 |
| 1,913,639 | Rice | Jan. 13, 1933 |
| 2,105,005 | Pearce | Jan. 11, 1938 |
| 2,252,444 | Stimson | Aug. 12, 1941 |
| 2,338,515 | Johns | Jan. 4, 1944 |
| 2,211,612 | Thompson | Aug. 13, 1940 |
| 2,262,651 | Reagan | Nov. 11, 1941 |
| 1,680,733 | Dietze | Aug. 14, 1928 |
| 1,381,086 | Dawson | June 7, 1921 |